Oct. 16, 1951 P. ALTMAN 2,571,404
POWER UNIT
Filed June 11, 1948 2 Sheets-Sheet 1
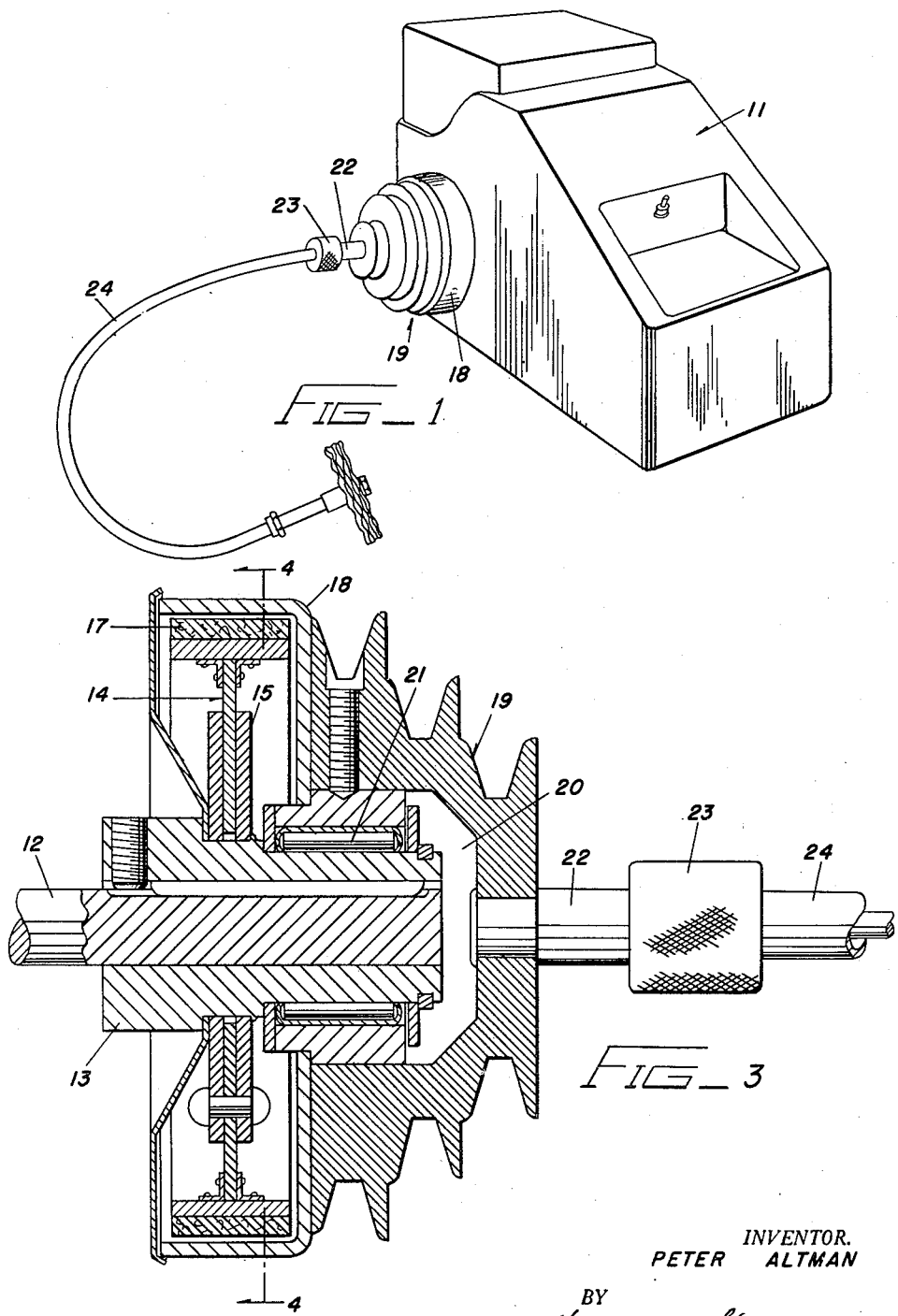
INVENTOR.
PETER ALTMAN
BY
Hauke & Hardesty
ATTORNEYS Oct. 16, 1951 P. ALTMAN 2,571,404
POWER UNIT
Filed June 11, 1948 2 Sheets-Sheet 2
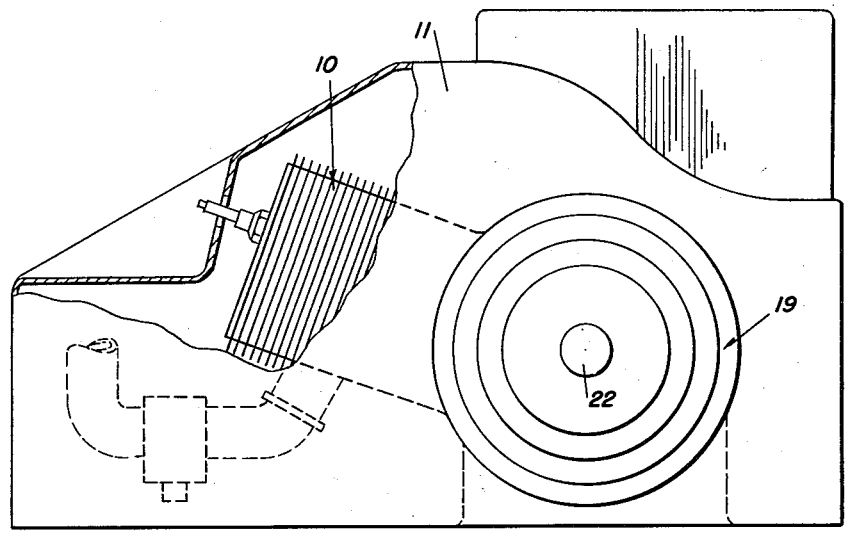
FIG_2
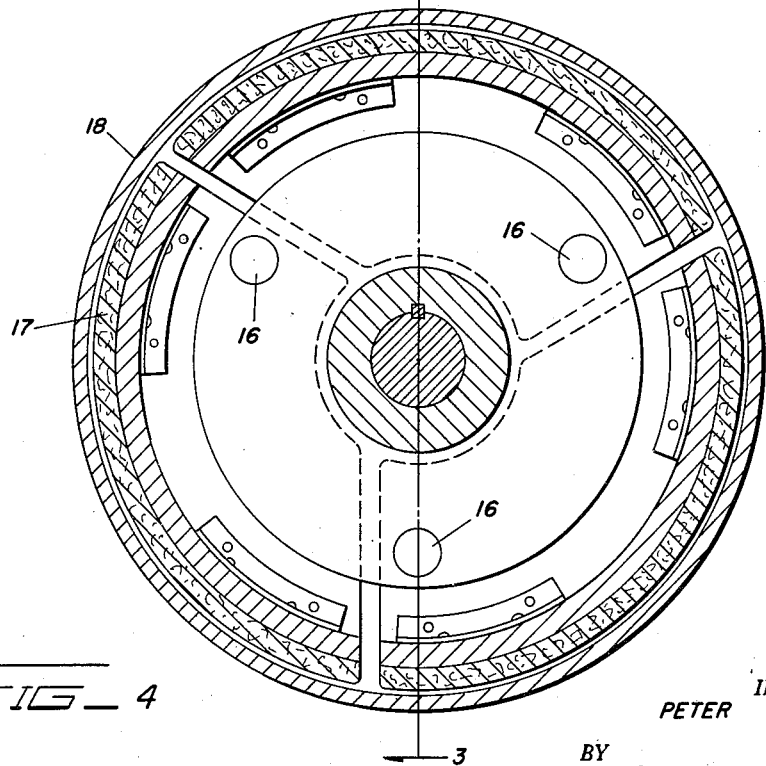
FIG_4
INVENTOR.
PETER ALTMAN
BY
Hauke & Hardesty,
ATTORNEYS.

Patented Oct. 16, 1951

2,571,404

UNITED STATES PATENT OFFICE 2,571,404

POWER UNIT

Peter Altman, Detroit, Mich., assignor to Continental Motors Corporation, Detroit, Mich., a corporation of Virginia Application June 11, 1948, Serial No. 32,410

2 Claims. (Cl. 74—16)

My invention relates to engines and more particularly pertains to a transmission which is especially applicable for direct assembly with a single cylinder internal combustion engine.

The maximum torque in a single cylinder engine is approximately seven times the average mean torque, and these high peak torques produce alternating stresses in a flexible drive shaft drivingly connected with said engine.

It is an object of my present invention to smooth out the torque and power impulses of the engine in order to considerably reduce these alternating stresses in said flexible drive shaft by constructing a centrifugal friction clutch in the transmission assembly which provides a friction damper between the engine crankshaft and power take-off of said transmission.

The above construction provides for smoother operation at the end of the shaft and consequently considerably increases the life of the flexible drive shaft.

For a more detailed understanding of my invention, reference may be had to the accompanying drawings illustrating a preferred embodiment of my invention, and in which Fig. 1 is a perspective view of the power unit showing a flexible drive shaft connected with the output shaft.

Fig. 2 is a side elevational view with parts of the engine housing broken away to show the single cylinder engine.

Fig. 3 is a longitudinal sectional view of the transmission taken substantially on the line 3—3 of Fig. 4, and Fig. 4 is a sectional view taken on the line 4—4 of Fig. 3, and showing the centrifugal friction clutch.

The power unit as herein illustrated comprises an internal combustion engine 10, preferably a single cylinder engine which is enclosed in a housing or other suitable enclosure 11. The engine crankshaft 12 extends through the housing and carries a hub or sleeve 13, which is preferably keyed to the crankshaft. Friction braking elements 14 are hinged to the collars 15 secured to the hub 13 as at 16 and carry braking bands 17 adapted to be forced under centrifugal force to engage with a driven member 18, such as a drum.

A pulley member 19 is secured to the drum and carries different diameter ways, and is preferably recessed as at 20, the end of the crankshaft projecting into the recess 20 and a bearing structure 21 is constructed for rotatably supporting the pulley on the crankshaft.

A stub shaft 22 is secured or otherwise fixed to the pulley, and is axially aligned with said crankshaft. An adapter 23 is carried by the stub shaft 22 and is drivingly connected with a flexible driving shaft 24, or other suitable work shaft.

It will be observed that in power plants of this type employing a small engine, preferably a single cylinder engine, the engine does not drive through a flywheel and consequently the engine torque and impulses are directly transmitted to the output end of the crankshaft. The centrifugal friction clutch is directly interposed between the crankshaft and the output shaft 22 of the power plant, and in this case is interposed between the crankshaft and pulley, and thus the friction clutch dampens or smooths out the torque or engine power impulses before same are transmitted to the pulley and flexible drive shaft connected therewith.

It will be apparent to those skilled in the art to which this invention pertains that various modifications and changes may be made therein without departing from the scope of the appended claims.

I claim:

1. A power unit for driving a flexible drive shaft and comprising a single cylinder engine producing an abnormally high maximum torque many times the average mean torque and having a crankshaft and a transmission assembly mounted directly on said crankshaft and solely supported thereby, said transmission assembly being adapted to smooth the torque and power impulses to reduce these alternating stresses in said flexible drive shaft, and comprising a hub secured to said crankshaft and providing a mounting for all elements of the transmission assembly, a driven member rotatably supported on the said hub, a centrifugal friction clutch directly driven by said hub on which it is mounted and engaging said driven member, and an anti-friction bearing carried by said hub to rotatably support said driven member.

2. A power unit for driving a flexible drive shaft and comprising a single cylinder engine producing an abnormally high maximum torque many times the average mean torque and having a crankshaft and a transmission assembly mounted directly on said crankshaft and solely supported thereby, said transmission assembly being adapted to smooth the torque and power impulses to reduce these alternating stresses in said flexible drive shaft and comprising a hub secured to said crankshaft and providing a mounting for all elements of the transmission assembly, a driven member rotatably mounted on said hub, a centrifugal friction clutch directly driven by said hub on which it is mounted and engaging said driven member, an anti-friction bearing carried by said hub to rotatably support said driven member, an axially recessed pulley secured to said driven member in spaced relation with the crankshaft and hub and having a central web; enclosing the end of said crankshaft and hub, a flexible drive shaft, and means connecting said flexible drive shaft to the web portion of said pulley in axial alignment with the crankshaft.

PETER ALTMAN.

REFERENCES CITED

The following references are of record in the file of this patent:

UNITED STATES PATENTS

| Number | Name | Date |
|---|---|---|
| 1,322,986 | Willour et al. | Nov. 25, 1919 |
| 1,658,344 | Kurtz | Feb. 7, 1928 |
| 2,027,638 | Forsberg et al. | Jan. 14, 1936 |
| 2,097,729 | Mall | Nov. 2, 1937 |
| 2,368,731 | Snyder et al. | Feb. 6, 1945 |
| 2,469,181 | Slater | May 3, 1949 |
| 2,477,332 | Garbe | July 26, 1949 |